(12) United States Patent
Cheng et al.

(10) Patent No.: US 8,354,821 B2
(45) Date of Patent: Jan. 15, 2013

(54) CONTACT-LESS POWER TRANSFER

(75) Inventors: Lily Ka-Lai Cheng, Cambridge (GB); James Westwood Hay, Cambridge (GB); Pilgrim Giles William Beart, Cambridge (GB)

(73) Assignee: Access Business Group International LLC, Ada, MI (US)

( * ) Notice: Subject to any disclaimer, the term of this patent is extended or adjusted under 35 U.S.C. 154(b) by 166 days.

(21) Appl. No.: 12/339,509

(22) Filed: Dec. 19, 2008

(65) Prior Publication Data

US 2009/0096414 A1 Apr. 16, 2009

Related U.S. Application Data

(63) Continuation of application No. 10/532,977, filed as application No. PCT/GB03/04654 on Oct. 28, 2003, now Pat. No. 7,622,891.

(30) Foreign Application Priority Data

Oct. 28, 2002 (GB) .................................. 0225013.2

(51) Int. Cl.
*H02J 7/00* (2006.01)
(52) U.S. Cl. ...................... 320/108; 320/107; 320/114
(58) Field of Classification Search .................. 320/108
See application file for complete search history.

(56) References Cited

U.S. PATENT DOCUMENTS

| | | | | |
|---|---|---|---|---|
| 3,938,018 A * | 2/1976 | Dahl | ............................. | 320/140 |
| 5,596,567 A | 1/1997 | deMuro et al. | | |
| 5,600,225 A | 2/1997 | Goto | | |
| 5,606,237 A | 2/1997 | Biasotti et al. | | |
| 6,489,745 B1 | 12/2002 | Koreis | | |
| 6,756,697 B2 * | 6/2004 | Mizutani et al. | ............. | 307/10.1 |
| 6,803,744 B1 | 10/2004 | Sabo | | |
| 6,819,080 B2 | 11/2004 | Barbeau et al. | | |
| 7,065,658 B1 | 6/2006 | Baraban et al. | | |
| 7,271,569 B2 | 9/2007 | Oglesbee | | |
| 7,352,567 B2 | 4/2008 | Hotelling et al. | | |
| 7,471,062 B2 * | 12/2008 | Bruning | ........................ | 320/108 |
| 2001/0055207 A1 | 12/2001 | Barbeau et al. | | |
| 2003/0030342 A1 * | 2/2003 | Chen et al. | ................ | 310/102 R |

FOREIGN PATENT DOCUMENTS

| | | |
|---|---|---|
| GB | 2398720 | 9/2004 |
| JP | 2001309579 | 11/2001 |
| WO | 01/16995 | 3/2001 |
| WO | 2008/137996 | 11/2008 |

OTHER PUBLICATIONS

United States Office Action dated Aug. 17, 2010, U.S. Appl. No. 12/339,512.

* cited by examiner

*Primary Examiner* — Edward Tso
*Assistant Examiner* — Johali Torres Ruiz
(74) *Attorney, Agent, or Firm* — Warner Norcross & Judd LLP

(57) ABSTRACT

A unit for transferring power in an inductive manner to at least one power-receiving device, and a system comprising such a unit and such a device. The unit includes at least one coil structure configured to allow various degrees of translational and rotational freedom of movement of the power-receiving device relative thereto. This provides increased ease of use, since it is not necessary for a user to place the power-receiving device in mechanical or other registration with the unit.

19 Claims, 14 Drawing Sheets

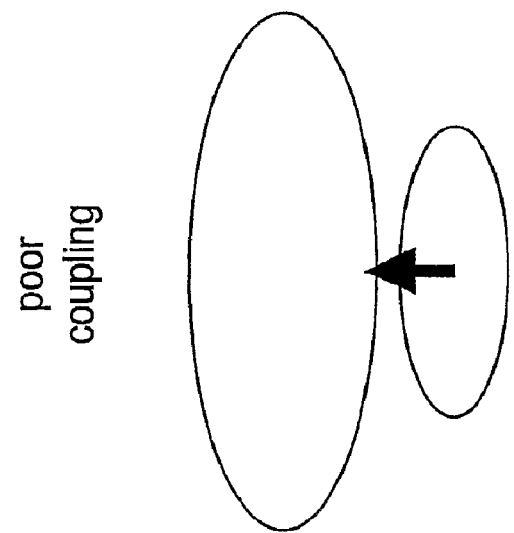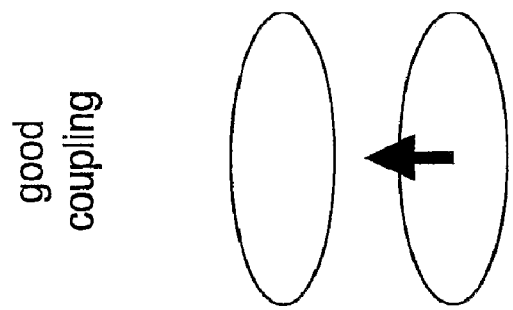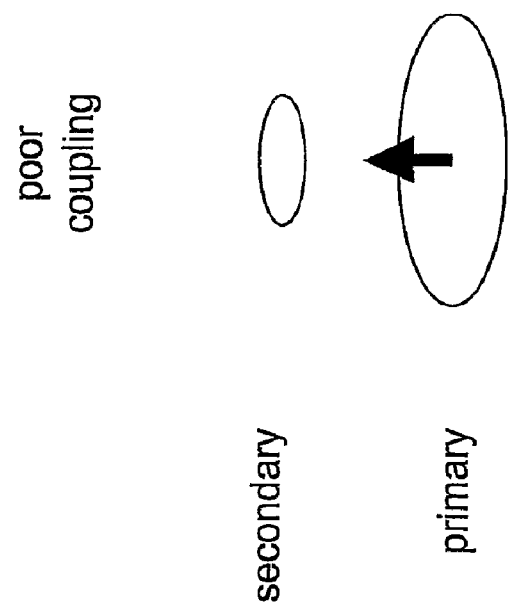
Figure 3

701

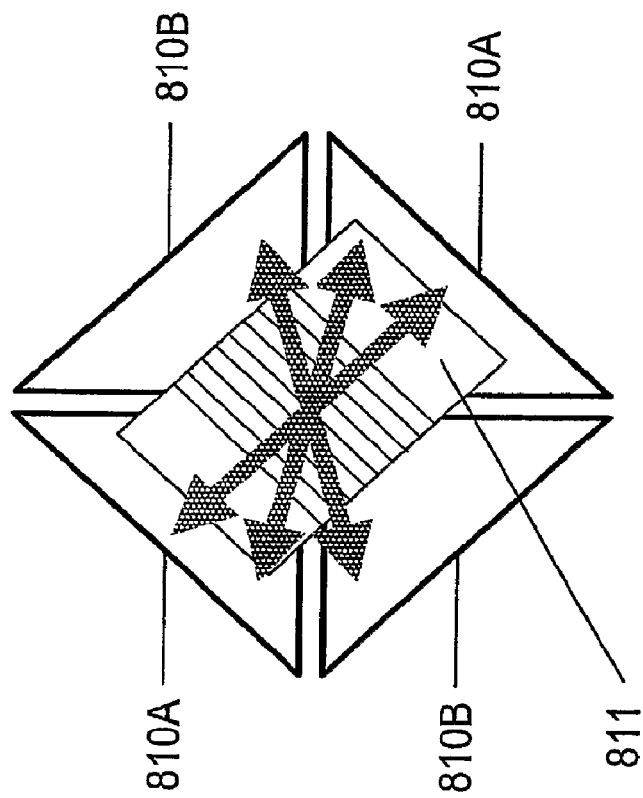
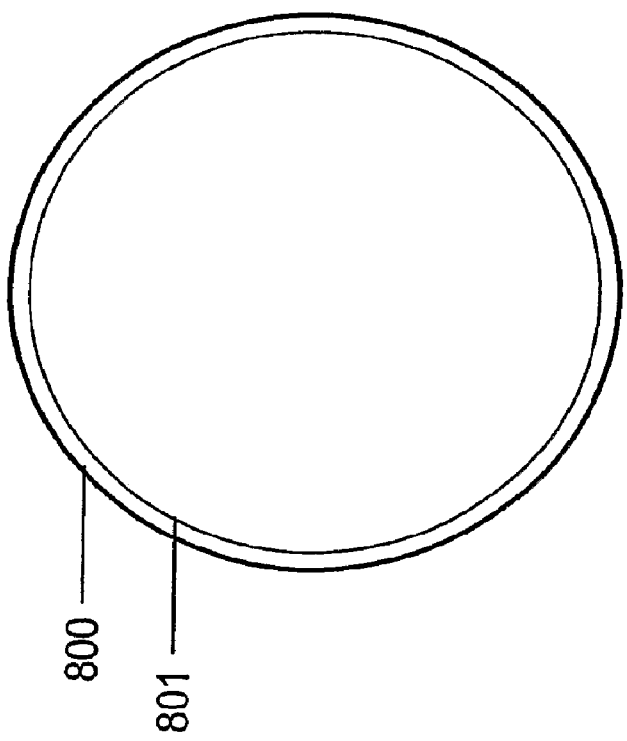
Figure 8b
Figure 8a
(Prior Art)

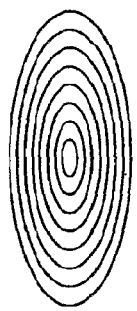
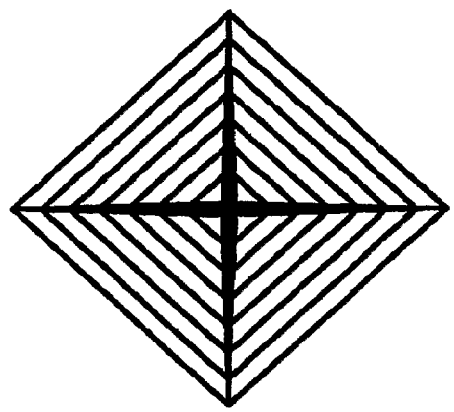
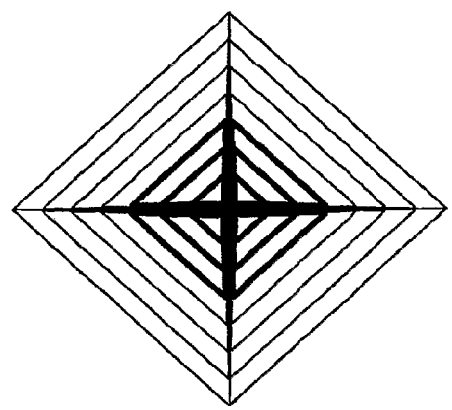
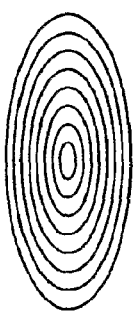
*Figure 9a*  *Figure 9b*  *Figure 9c*
*Figure 9d*  *Figure 9e*  *Figure 9f*

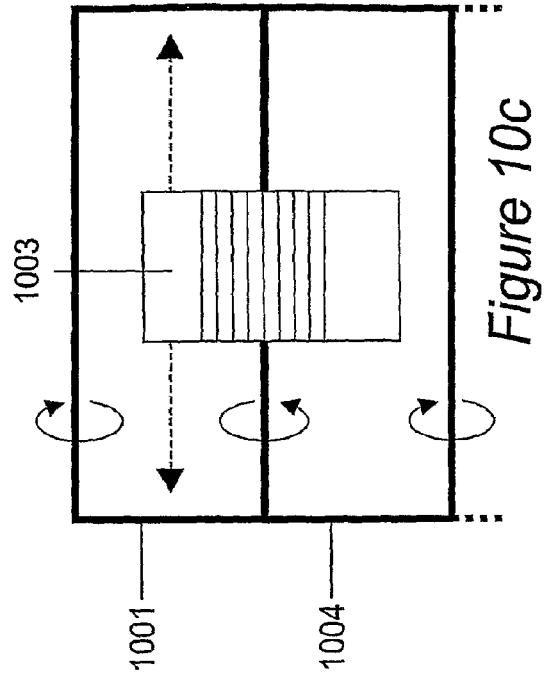
*Figure 10c*
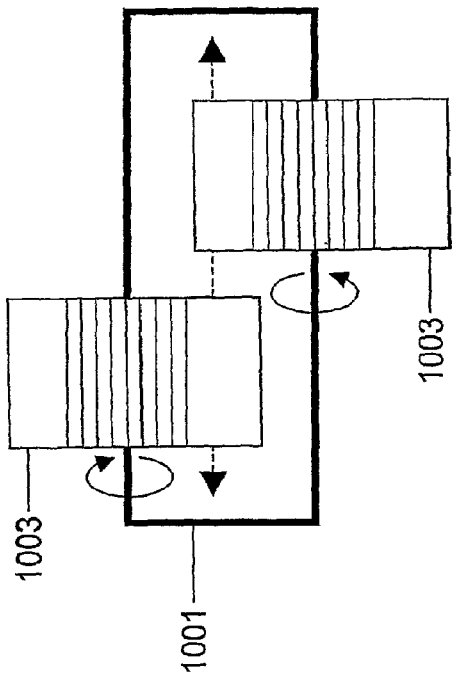
*Figure 10b*
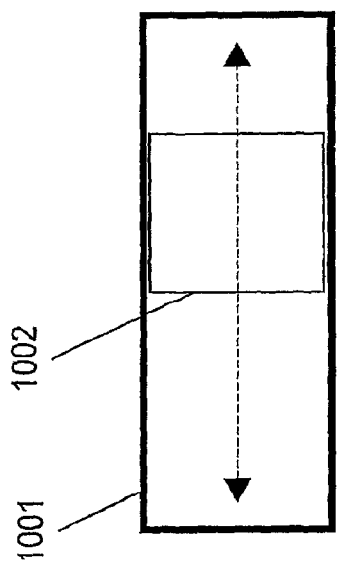
*Figure 10a*
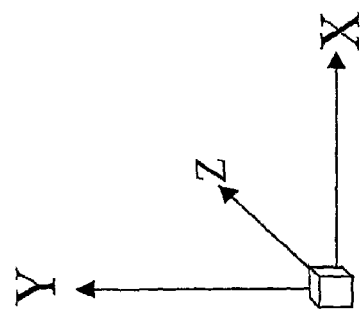

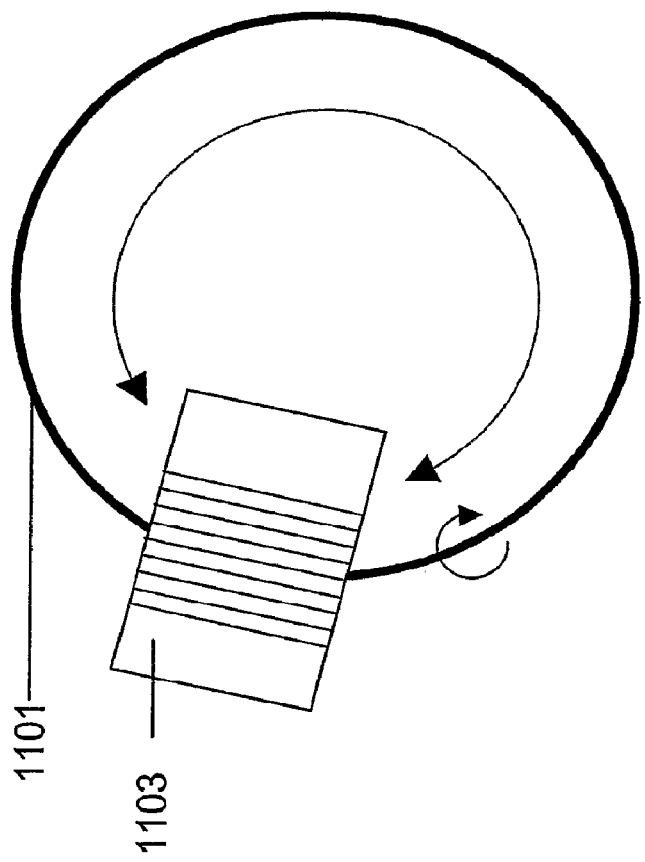
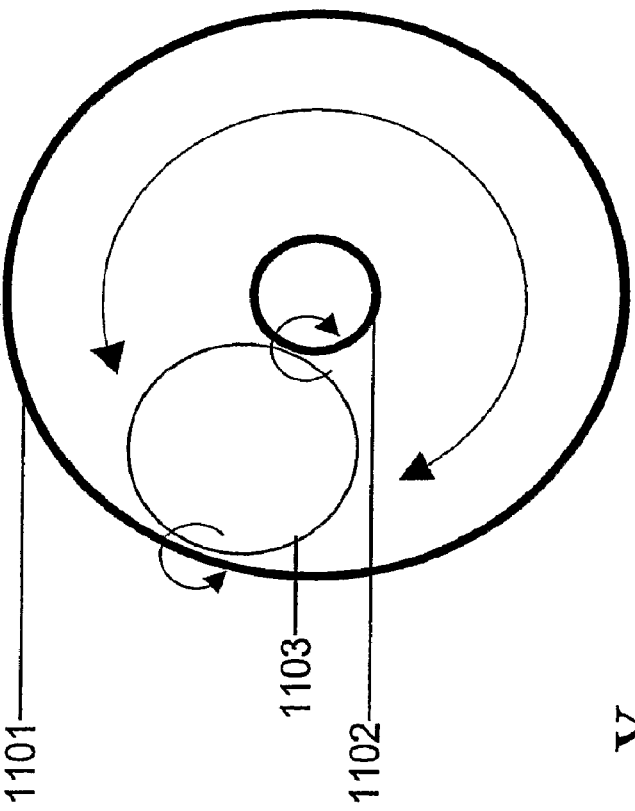
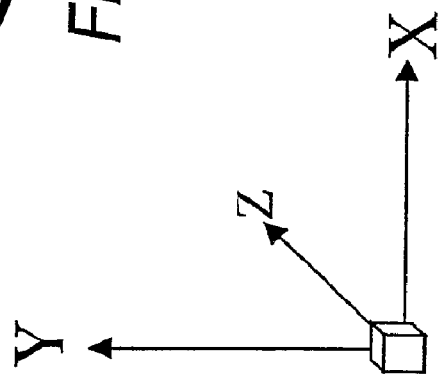
*Figure 11b*
*Figure 11a*

CONTACT-LESS POWER TRANSFER

This application is a continuation of U.S. application Ser. No. 10/532,977, filed Apr. 28, 2005 now U.S. Pat. No. 7,622,891, which is a national stage filing of PCT Application No. PCT/GB2003/004654, filed Oct. 28, 2003.

BACKGROUND

This invention relates to a new device for transferring power in a contact-less fashion, for example electromagnetic induction.

Today's inductively-chargeable portable devices, for example the Braun Oral B Plak Control power toothbrush, must typically be precisely aligned with their charger in order to charge them. This precision is necessary so that the coil in the device is correctly aligned with the coil in the charger—the coils being, in effect, the two halves of a conventional power transformer.

Some examples of typical prior art are shown in FIG. 1. In FIG. 1a, the primary coil of the charger is aligned with the secondary coil of the device. In FIG. 1b, a horseshoe electromagnet on the charger is aligned with a similar electromagnet on the device. FIG. 1c operates in a very similar way to FIG. 1b: the field is created by two coils operating in antiphase (with the lower return circuit being an air gap), and the secondary coil is a flat wound coil. Prior art such as U.S. Pat. No. 4,873,677 works in such a fashion. Note in all cases the precise alignment that is required in order to achieve good coupling between the primary and secondary coils.

Referring now to FIG. 2 which explains some terminology used in the present application: FIG. 2a shows some charger 201 with a surface 203, the charger 201 emitting a field, and some device 202 charging from the charger 201 (and appreciating that in this figure the shapes of both are irrelevant). FIG. 2b shows that the device 202 may move about on ("be translated relative to") the surface 203 of the charger 201 in two directions, depicted X and Y, which are at right angles to one another. The device 202 may also move nearer to and further from the charger 201 in direction Z, but as this will eventually take it out of the charging field, and this is therefore not considered here.

FIG. 2c shows that in addition to the above translations, the device 202 may rotate around the X axis (rX), the Y axis (rY) and the Z axis (rZ). In the present application, only rotations about rZ, and not those around rX or rY, shall be considered. Each of these six translations and rotations is independent from (also known as "orthogonal to") the others, and is known as a "degree of freedom".

FIG. 2d shows an alternative translation co-ordinate system. Instead of orthogonal (X,Y) movement, the position of the device 202 is determined by the radius (r) and the angle (θ) from some centre point. Even though θ involves rotation, it is still a translational degree of freedom, since the device 202 itself need not rotate about its own axis.

For maximum user convenience a system should allow up to five degrees of freedom—translation in the Z axis not being of practical use—so that a device 202 can be placed without regard to its position or orientation on the charger 201.

But today's toothbrush chargers and the like are typically much more constrained. Systems employing the transformer configuration shown in FIG. 1a offer one degree of freedom (rotation in the plane of the coils), and those shown in FIG. 1b and FIG. 1c offer zero degrees of freedom, since if the device is to continue to receive adequate power it cannot be either rotated nor translated relative to the charger. Having zero—or only a few—degrees of freedom requires precise alignment which may be inconvenient to the user because it requires a degree of care and manual dexterity in placing the device 202 on the charger 201.

In addition, systems lacking the translational (X and Y) degrees of freedom cannot charge multiple devices simultaneously, because of course not more than one device can occupy the required (X,Y) position at once.

In addition, such systems requiring precise primary:secondary alignment are also not a universal inductive charging solution—one able to charge devices with very different power requirements—because the different coil sizes mandated by the power needs of different types of devices will not be a good match for any single size of charger coil—see FIG. 3.

Various means of increasing the number of degrees of freedom have been proposed.

One simple method is to have a large coil in the charger, emitting a large field, allowing the device to pick-up sufficient power even if it is not perfectly aligned. FIG. 4, for example, shows such a charger coil 401 and device coil 402. This is the method adopted by various RFID devices. However the coupling between the coils 401 and 402 will be poor and highly variable dependent on position, so this solution is inefficient and limits the power that can be transferred while still complying with emission legislation. Therefore this solution is far from ideal in charging applications, where efficiency is typically an important criterion.

A solution which improves upon the efficiency of such "large coil" systems, while still offering several degrees of freedom, is to use multiple coils in the charger, enabled as appropriate, ensuring that there is always a reasonable match between nearby charger coils and the device coil. See FIG. 5, showing multiple charger coils 501 and single device coil 502. Prior art includes:

A system is described in the Journal of the Magnetics Society of Japan titled "Coil Shape in a Desk-type Contactless Power Station System" (29 Nov. 2001)

An alternative solution is the present applicant's UK patent application number 0210886.8 of 13 May 2002, which discloses a system generating a horizontal field across the surface of the charger, in contrast to conventional solutions which generate a vertical field out of the surface of the charger. A copy of equivalent International patent application no PCT/GB2003/002030 is being filed with the present application so as to form part of the file thereof, and the full contents of PCT/GB2003/002030 are hereby incorporated into the present application by reference. This offers the same two translational degrees of freedom (X and Y) as the above multiple-coil approach, but with better field uniformity and therefore worst-case efficiency. Optionally, the horizontal field may be rotated in the plane of the charger, offering an additional one degree of rotational freedom (rZ). See FIG. 6 which shows a laminar charger 601 generating a magnetic field in the plane of the charger 602 and a device 610 capable of receiving power from such a field when it is in a certain alignment 611. If the field generated by the charger is made to rotate, as shown, then there is no requirement to align the device in any particular orientation.

BRIEF DESCRIPTION OF THE DRAWINGS

FIG. 3 shows exemplary coupling relationships.

FIGS. 8A-8B show a system with a single rotational degree of freedom.

FIGS. 9A-9F show various concentric charger and device configurations.

FIGS. 10A-10C show various configurations where the primary charger coil is larger than the secondary device coil.

FIG. 11A shows a large primary coil with a small primary coil inside it.

FIG. 11B shows a device straddling an outer primary coil.

DESCRIPTION OF EMBODIMENTS

Figure 1C:
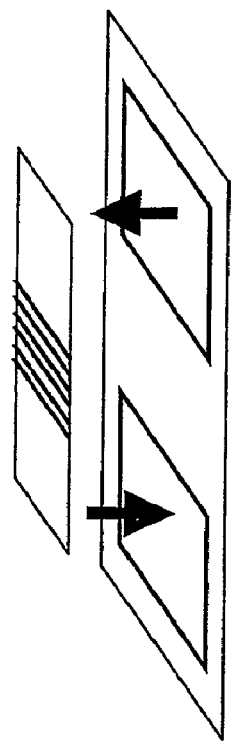
FIGS. 1A-1C show various configurations of primary and secondary coils.
Figure 1B:
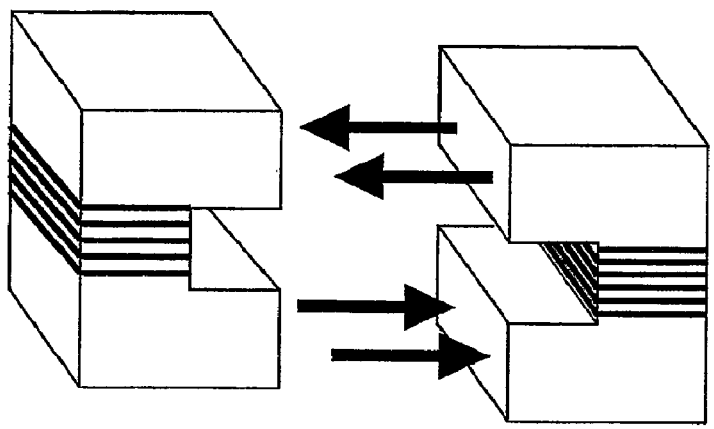

According to a first aspect of the present invention, there is provided a unit for transferring power in an inductive manner to at least one power-receiving device, the unit being provided with at least one electrical coil, and the power-receiving device being capable of receiving power when placed in more than one position or rotation on the unit.

The unit may include a pad in which the coils are disposed, the pad serving as a surface upon which power-receiving devices may be placed in order to effect power transfer. The unit may incorporate a power supply or be connectable to a power supply. The pad is preferably a laminar pad, i.e. has a configuration of a lamina. In other words, the pad is preferably generally flat, and may be substantially planar, it being understood that the pad may take a curved form or be made conformal to a curved surface such as the inside of a glove compartment in an automobile. This may apply also to the further aspects of the invention set out hereinbelow.

According to a second aspect of the present invention, there is provided a unit for transferring power in an inductive manner to at least one power-receiving device, the unit being provided with a plurality of electrical coils, the electrical coils not all being of the same shape.

The coils may be simple conductive loops, or may comprise a more complex arrangement of conductors. Where a more complex arrangement of conductors is provided, for example as disclosed in the present applicant's co-pending UK patent applications numbers 0210886.8 of 13 May 2002 and 0213024.3 of 7 Jun. 2002 (the full disclosures of which are hereby incorporated into the present application by reference), the term "coil" in the context of the present application is intended to denote each separate arrangement of conductors that defines a given charging region or active area on the primary unit and on which a secondary device is placed in order to effect charging.

The plurality of electrical coils preferably in this aspect may also not all be of the same size and/or not all enclose the same dimensional area.

According to a third aspect of the present invention, there is provided a unit for transferring power in an inductive manner to at least one power-receiving device, the unit being provided with a plurality of electrical coils, the electrical coils not all being of the same size and/or not all enclosing the same dimensional area.

In some embodiments, all the coils may be of mutually different shapes and/or sizes and/or dimensional areas. In other embodiments, two or more of the plurality of coils may have the same shape and/or size and/or dimensional area, with the remaining coils having one or more different shapes and/or sizes and/or dimensional areas, or all having the same different shape and/or size and/or dimensional area.

The coils may be spatially separated from each other such that no coil is enclosed in or overlaps with any other coil. Alternatively, one or more smaller coils may be contained within a boundary of one or more larger coils. Where one or more smaller coils are contained within a boundary of a larger coil, the coils may be substantially concentric, or may have some other arrangement. For example, a plurality of smaller coils may be contained within a boundary of a larger coil in such a way that the smaller coils are not contained within each other or overlap with each other. Some smaller coils may be nested within each other within the boundary of a larger coil, with some other smaller coils not being nested within each other within the same outer boundary.

The coils may take various shapes, including circular, elliptical, generally ovate, triangular, rectangular, parallelogram, trapezoidal, star-shaped, regular polygonal, irregular polygonal or amorphous.

According to a fourth aspect of the present invention, there is provided a unit for transferring power in an inductive manner to at least one power-receiving device, the unit being provided with at least one plurality of nested electrical coils and also with means for selectively activating one or more of the nested electrical coils so as to be adaptable to provide efficient power transfer to power-receiving devices of different sizes and/or power requirements and/or positions/rotations.

The means for selectively activating one or more of the nested coils may be adapted automatically to sense an appropriate size and/or power requirement and/or position/rotation determinant of the power-receiving unit (for example, a size or sizes of secondary power-receiving coils in the power-receiving device).

The nested coils may be substantially circular, or may take any other appropriate shape as outlined above.

In a particularly preferred embodiment, there are provided four nested sets of electrical coils, each having a substantially right-angled triangular shape, and arranged such that the right-angles of the four sets of coils all point towards a single origin point such that the four sets of nested coils have an overall substantially square or rectangular configuration. Preferably, adjacent sets of coils are driven in antiphase so as to cause rotation of a resultant electromagnetic field about the origin point, thereby providing a degree of rotational freedom in the positioning of a power-receiving device on the pad.

According to a fifth aspect of the present invention, there is provided a unit for transferring power in an inductive manner to at least one power-receiving device, the unit being provided with an even number of electrical coils each having corner portion, the coils being arranged such that the corner portions all point towards an origin point, and wherein, in operation, adjacent coils are driven in antiphase so as to cause rotation of a resulting electromagnetic field about the origin point.

There is preferably provided four coils, which may each have a substantially right-angled triangle shape, a quarter circular shape or any other appropriate shape. Where more than four coils are provided, they may each have a generally triangular shape or take the shape of a sector of a circle.

Any of the first to fourth aspects of the present invention may be combined with at least one power-receiving unit so as to form a system for contact-less power transfer.

According to a sixth aspect of the present invention, there is provided a system for contact-less power transfer, the system comprising a power-transmitting unit provided with a primary coil and at least one power-receiving device incorporating a secondary coil, wherein the primary coil is generally elongate along an x-axis with respect to an orthogonal y-axis, and wherein the secondary coil is sized so as to be sufficiently similar in size to the primary coil with respect to the y-axis so as to provide efficient power transfer, but smaller in size with respect to the x-axis so as to provide a translational degree of freedom of movement along the x-axis.

In this way, several power-receiving devices may be simultaneously provided with power by the primary coil by placing the devices adjacent each other along the x-axis.

The primary coil may be generally rectangular, or any other appropriate shape, including elliptical or generally ovate. The secondary coil preferably has a corresponding rectangular (possibly square) or elliptical or ovate or other configuration, subject to the constraints that the extent of the primary coil along the y-axis is substantially similar to that of the secondary coil along the y-axis, and that the extent of the primary coil along the x-axis is greater than that of the secondary coil along the x-axis. Preferably, the extent of the primary coil along the x-axis is at least twice, advantageously at least three or four times, that of the secondary coil along the x-axis.

According to a seventh aspect of the present invention, there is provided a system for contact-less power transfer, the system comprising a power-transmitting unit provided with at least one primary coil having a boundary portion and at least one power-receiving device incorporating a secondary coil, wherein power transfer takes place by way of coupling of near-field flux flowing about the boundary portion of the at least one primary coil with windings of the secondary coil.

There may be provided just a single primary coil of appropriate configuration, or a plurality of adjacent primary coils which will enable a plurality of power-receiving devices to receive power simultaneously.

The at least one primary coil may be generally rectangular in shape, in which case there is one linear degree of freedom of movement of the secondary coil.

Alternatively, the at least one primary coil may be substantially circular or elliptical or the like, in which case a rotational degree of freedom of movement is provided.

According to an eighth aspect of the present invention, there is provided a system for contact-less power transfer, the system comprising a power-transmitting unit provided with first and second substantially concentric primary coils, the first being larger than the second, and at least one power-receiving device incorporating at least one secondary coil dimensioned so as to correspond to a distance between the first and second primary coils, wherein power transfer takes place by way of coupling of near-field flux flowing about the boundaries of the first and second primary coils with generally opposed edges of the secondary coil.

The first and second primary coils in this aspect are supplied with currents flowing in opposite directions. The coils may be generally circular, or may take any other appropriate shape as hereinbefore described.

Summarising the above, the table below lists the desirable characteristics of any inductive charging system, and illustrates how those of the present invention compare with prior art:

|  | Today's chargers | Present invention | UK 0210886.8 |
|---|---|---|---|
| Simple (therefore cheap to make) | Y | Y | Y |
| Efficient and uniform field (high-power within regulations) | Y | Y | Y |
| Simultaneous (more than one device at a time) | N | Y | Y |
| Universal (many types of devices) | N | Y | Y |
| Degrees of freedom (convenience) | 0 or 1 (rZ) | 0..2 of (X, Y, rZ) | 2 (X, Y) 3 (X, Y, rZ) |

Embodiments of the present invention may therefore provide greater simplicity (and thus reduced cost) by offering a number of degrees of freedom which is less than that of GB 0210886.8, but greater than that of today's "toothbrush" chargers, while still preserving many of the benefits of GB 0210886.8 (Simplicity, Efficiency, Simultaneity and Universality).

Additionally, this may optionally be achieved while still retaining forward compatibility with devices and chargers of the type described in GB 0210886.8.

Figure 7A:
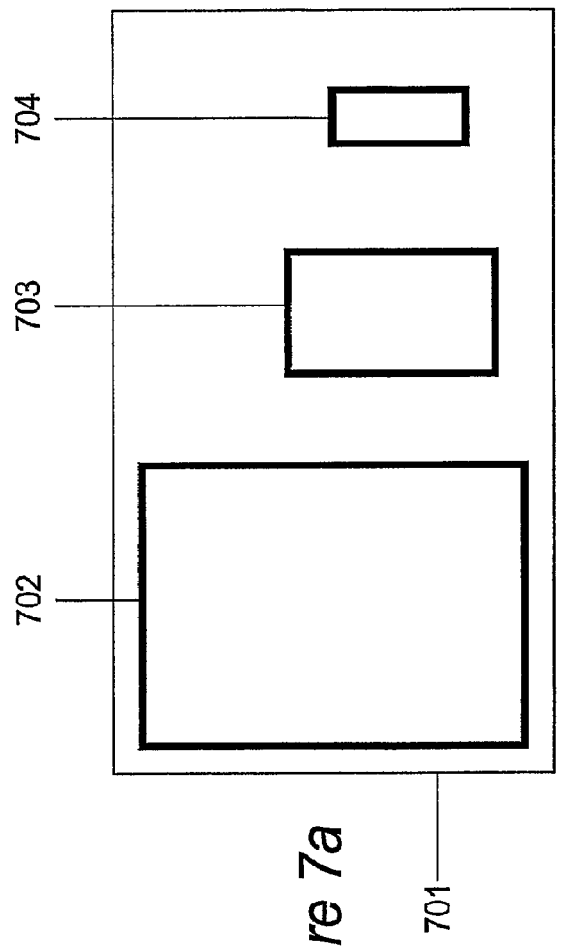
FIGS. 7A-7D show different types of charger configurations which each have several sizes or shapes of coils.
Figure 7C:
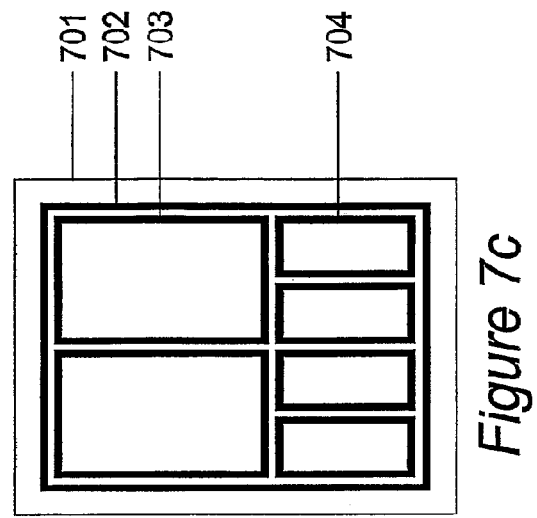
Figure 7B:
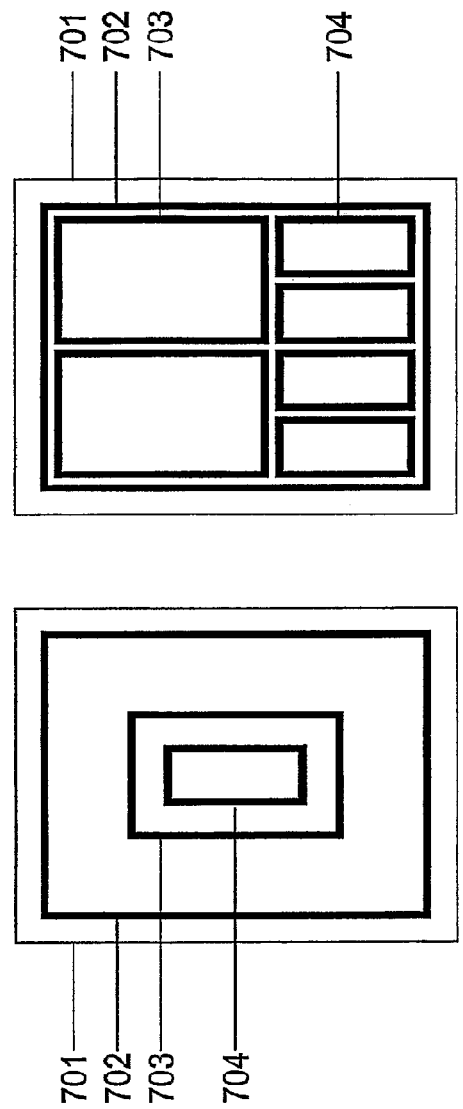

There shall now be described various embodiments of the present invention that fit into the following three categories:
1. No degrees of freedom—the charger has different positions for different types of device (FIG. 7)
2. Only the rZ rotational degree of freedom, so the device has to be placed in the correct position on the charger. The charger has a single location with an effective coil size that alters with device needs (FIG. 8 and FIG. 9)
3. Only one translational degree of freedom (FIG. 10), either:
   a. Linear translational
   b. Circular translational, and rotational
      Addressing each of these categories in turn:
1. No Degrees of Freedom FIGS. 7a,7b,7c show three different types of charger configuration 701 which each have several sizes or shapes of coil 702,703,704. Each coil could be, for example, a multiply-wound coil of a type similar to that in FIG. 1a. The coils may all be driven simultaneously, or only when a device is sensed.

The location and/or rotation and/or type of each coil is made clear by some indicator, allowing the user to place their device onto the coil which best couples to it, and in the correct orientation if such is necessary.

In FIG. 7a, the coils are spatially separate (allowing multiple devices to be charged simultaneously), in FIG. 7b they are concentric, and in FIG. 7c they are a mixture of the two.

Figure 7D:
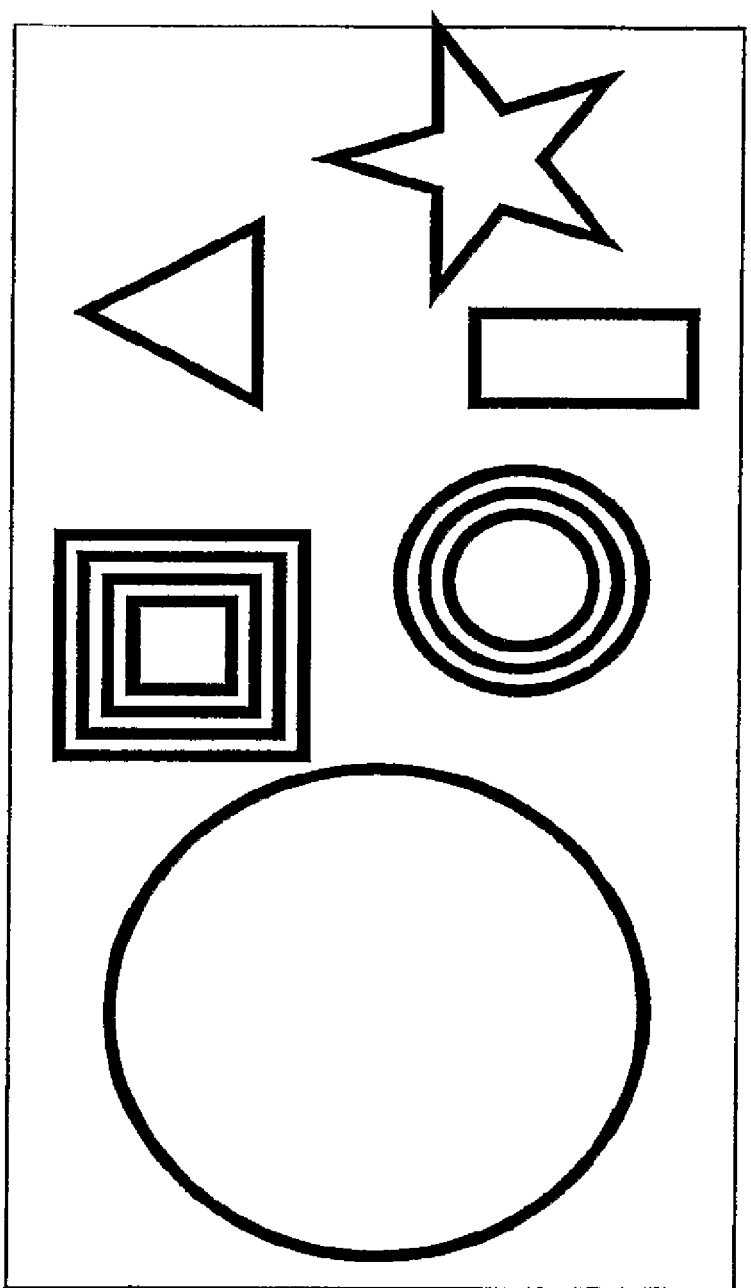

The coils can of course be of any shape to suit the device, and some examples are shown in FIG. 7d.

2. Only the One rZ Rotational Degree of Freedom

Figure 1A:
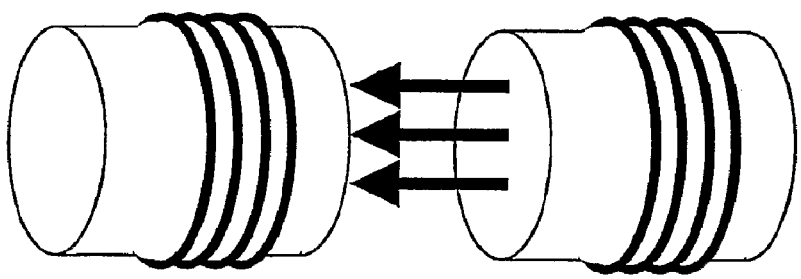
Figure 2A:
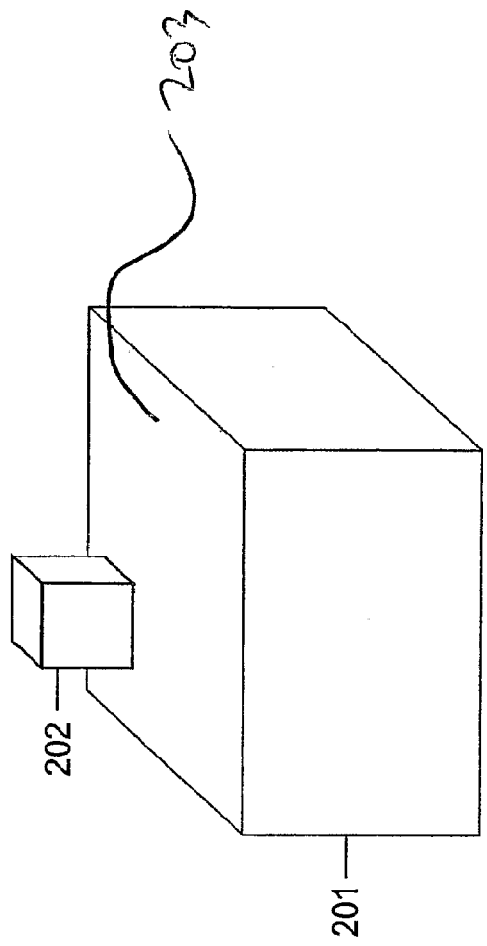
FIG. 2A shows a device and charger.
Figure 2D:
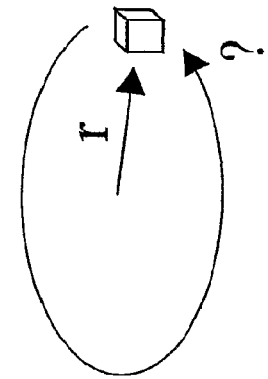
FIGS. 2B-2D show exemplary translation and rotational coordinate systems.
Figure 2C:
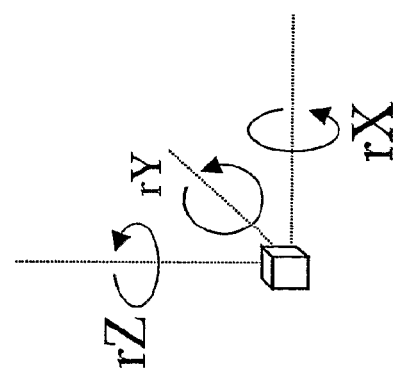
Figure 2B:
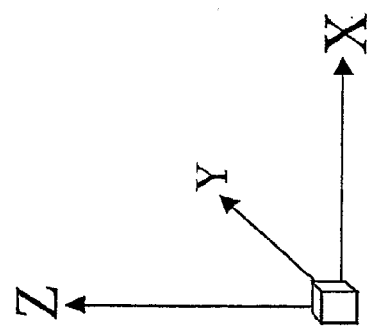
Figure 4:
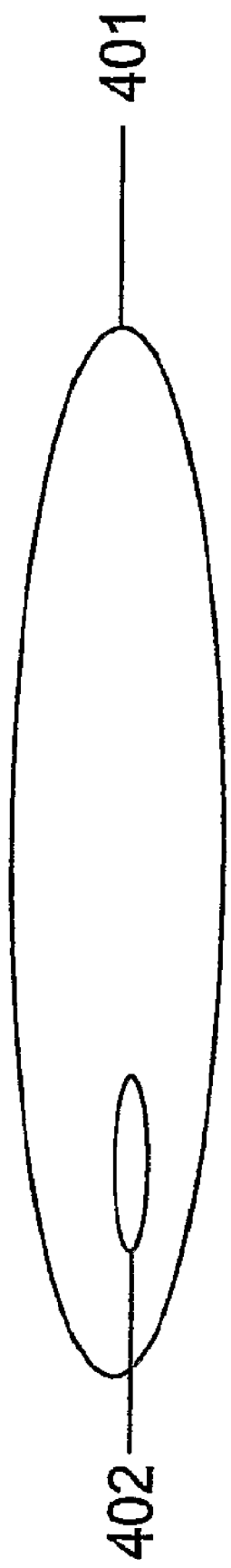
FIG. 4 shows a charger coil and device coil that are not perfectly aligned.
Figure 5:
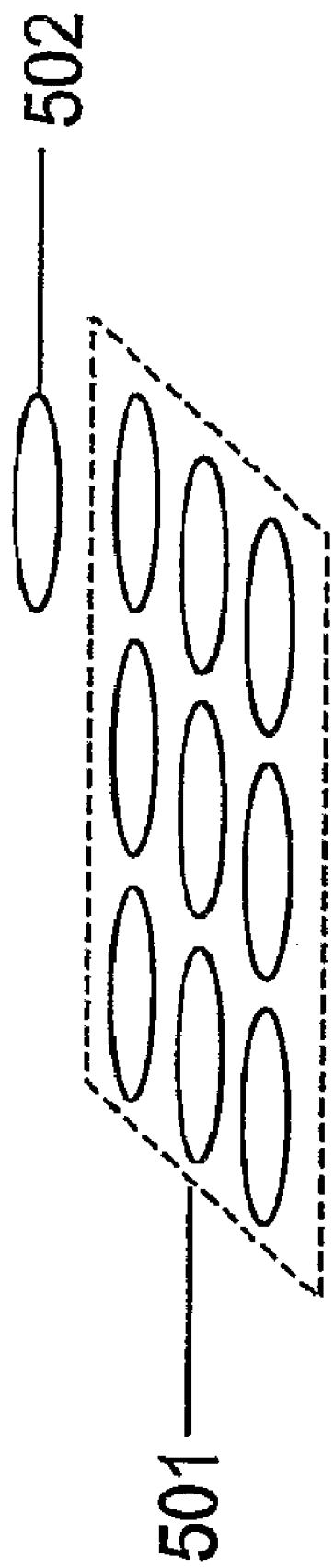
FIG. 5 shows multiple charger coils and a single device coil.
Figure 6:
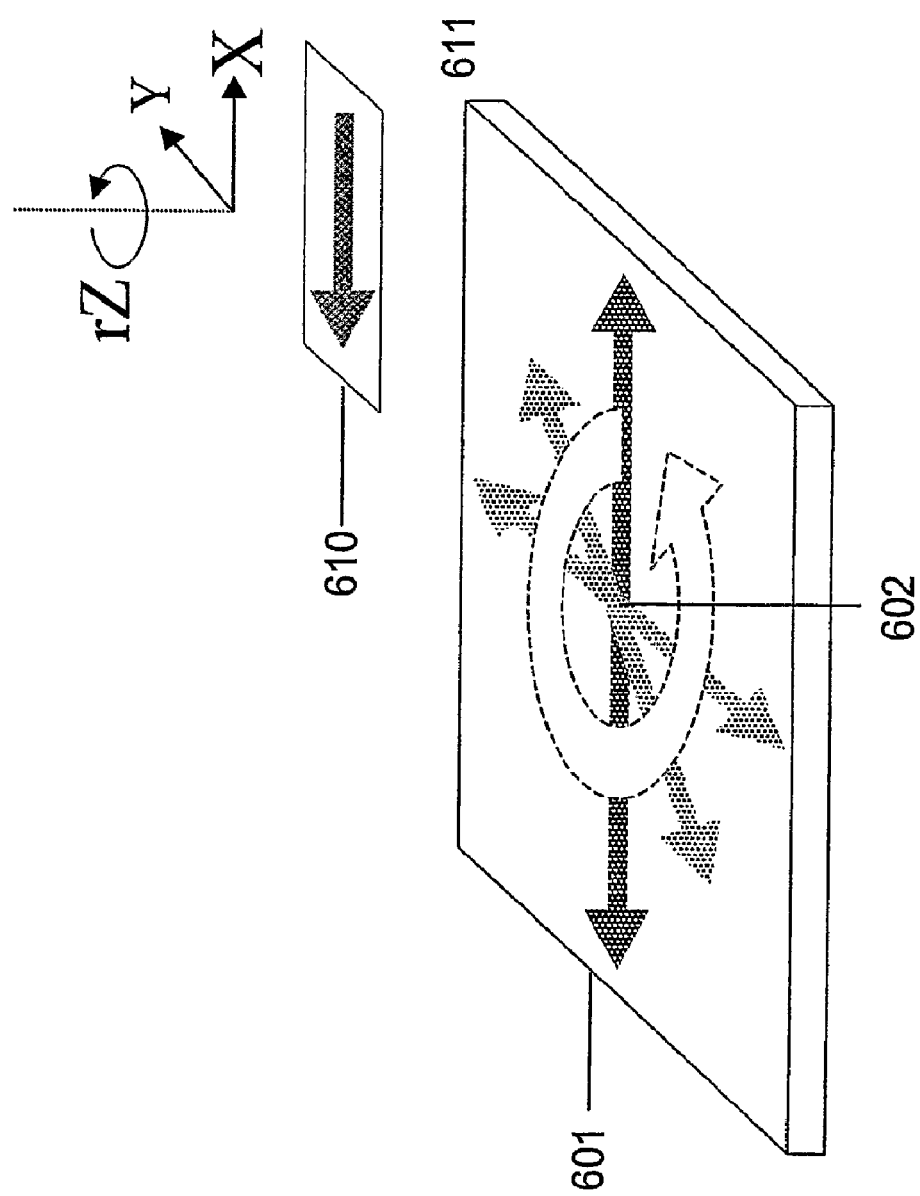
FIG. 6 shows a laminar charger generating a magnetic field in the plane of the charger and a device capable of receiving power.

FIGS. 1a and 8a show a prior art system with a single rotational degree of freedom—a coil on the primary 800 couples to a corresponding coil on the device 801 in the manner of a simple transformer.

FIG. 8b shows an alternative method of achieving the same rotational degree of freedom for a device 811 which expects a field in the manner of FIG. 1c. An antiphase field is driven into sets of coils 810A and 810B such that the field rotates from being aligned in the 810A axis to being aligned in the 810B axis and back to 810A. Thus over time the device receives a significant amount of power no matter what its orientation.

FIG. 9 extends these two means of generating a rotational degree of freedom by adding universality. A charger 901 consists of a number of such coils, arranged concentrically, each of which can be driven independently. The charger behaves differently depending on which type of device is present 902.

In FIG. 9*a* no device is present, and so no charger coils are driven.

In FIG. 9*b* a physically small device with correspondingly small power requirements is present, and so only a few of the inner coils are driven.

In FIG. 9*c* a physically large device with correspondingly large power requirements is present, and so many of the coils are driven.

FIGS. 9*d*,9*e*,9*f* show a charger with a coil configuration 903 of the type shown in FIG. 8*b*, but again arranged concentrically as above, with similar benefits.

3a. One Linear Translational Degree of Freedom

FIG. 10 shows various configurations in which the primary charger coil is larger than the secondary device coil, but constrained in its dimensions such that it offers a reasonably efficiency with a single translational degree of freedom in the X axis, and therefore the option of simultaneous charging of multiple devices.

In FIG. 10*a* a rectangular charger coil 1001 drives a smaller device coil 1002 by generating a field in the Z axis. By being similar in size to the device coil in the Y dimension, reasonable efficiency is obtained. By being significantly larger than the device coil in the X dimension, one degree of translational freedom is achieved.

Of course the coils could be any type of shape (for example ellipsoidal) rather than rectangular as shown—an important point is the aspect ratio.

FIGS. 10*b* and 10*c* achieve a similar result for devices of the FIG. 1*c* type, 1003. In FIG. 10*b*, a charger coil identical to FIG. 10*a* is used. In FIG. 10*a* it was be considered to be generating a net flux out from the centre of the coil in the Z dimension, but it can equally be viewed "up close" to the edge of the coil as generating a flux which is rotating around the wire(s), as shown in FIG. 10*b*. Therefore if a device of FIG. 1*c* is placed across any edge of the coil, it will receive the flux.

In FIG. 10*c* a second coil is placed below the first 1004. If placed along the boundary between the two, as shown, the device coil will receive power from each coil. Of course this concept can be extended indefinitely in the Y dimension, as shown with a dotted line, to produce any number of lines along which a device may receive power.

3b. One Circular Translational Degree of Freedom

FIG. 11*a* shows a large coil 1101 with a small coil 1102 inside it. The coils carry current in opposite directions, and so will generate a net flux flowing in the Z axis (out of the page). If a device with a coil 1103 is placed anywhere within the annulus formed between the coils, it will receive this flux with reasonable efficiency. Thus the device has a circular translational degree of freedom, and multiple devices can be placed on the charger.

FIG. 11*b* shows a similar scheme working with a device of FIG. 1*c* type.

The device straddles the outer coil 1101 to couple with it. This could be seen as a variant of FIG. 10*b*.

It will be appreciated that the coils do not have to be circular.

In each of the above cases, the charger may sense if any device is present on any particular coil, and if so what its power needs are. Possible means for doing this include but are not limited to:

Sensing the resonance ("Q") or other characteristics of the driven coils

Communication by modulation of data signals onto the magnetic field (e.g. "back-scatter", as used by RFID devices).

In all embodiments of this present application, the user has limited degrees of freedom when placing devices. Therefore it may be advantageous to indicate these constraints to the user.

Such indications may be done in a variety of ways, for example:

For chargers with placement restrictions, indicating the correct device position by means of:
Outlining of the coil area
Filling, or patterning, the active coil area.

For chargers with rotational restrictions, indicating the correct device rotation by means of:
A line or arrow, or set of such.

The indications may be rendered in any number of media, for example:
Printing ink, perhaps of a particular colour
Raising or lowering the charger surface.
Overall shape of the charger, or part of it.
The device may include corresponding indications.

Figure 12C:
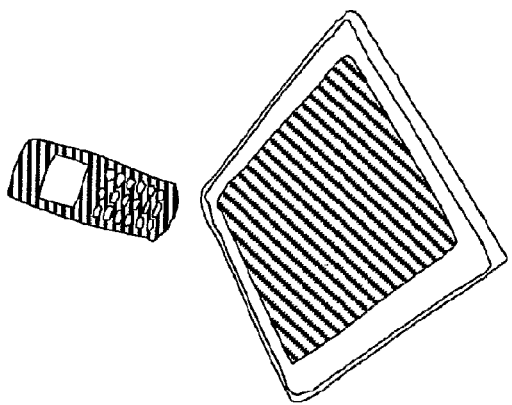
FIGS. 12A-12E show possible indications.
Figure 12B:
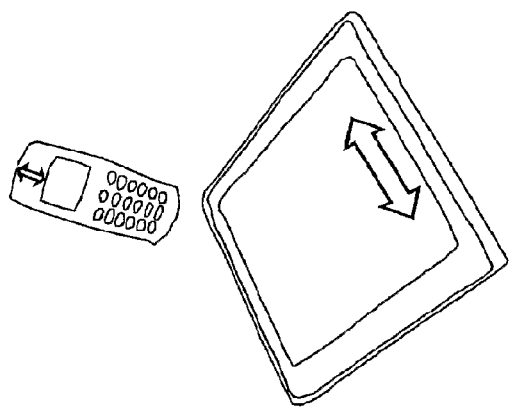
Figure 12E:
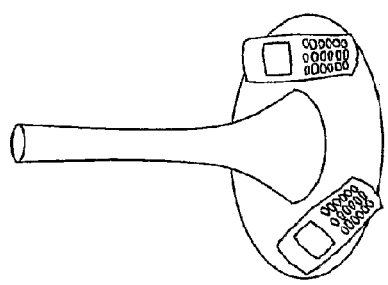
Figure 12A:
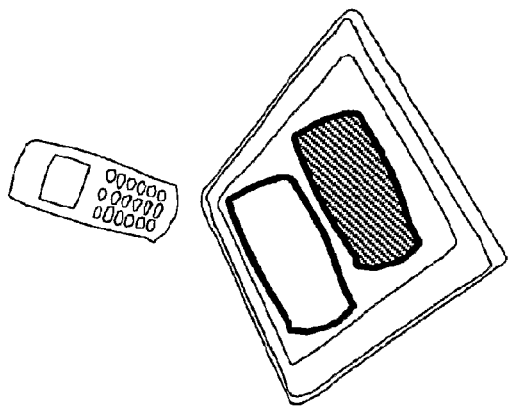

Some examples of possible indications are shown in FIG. 12, which:

FIG. 12*a* shows a printed or raised outline of two devices, for chargers which have no degrees of freedom.

FIG. 12*b* shows a printed or raised arrow on both the charger and the device, for chargers with 2 translational but not rotational degrees of freedom.

FIG. 12*c* shows similar to 12*b*, but with striped indication instead of arrows.

Figure 12D:
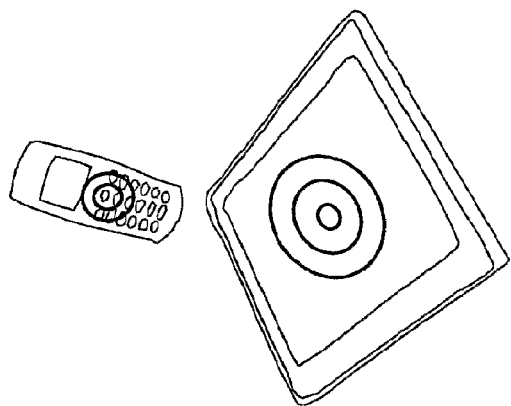

FIG. 12*d* shows a "target" of concentric circles on both charger and device, for chargers with only a rotational degree of freedom.

FIG. 12*e* shows a charger with one circular translational degree of freedom, designed such that the active area of the charger is obvious from its form.

Prior art such as U.S. Pat. No. 5,952,814 [Philips phone charger with interlock] describes how the casing of charger may be made to match the internal shape of the charger thus allowing for accurate alignment of the primary and secondary coils.

Figure 13A:
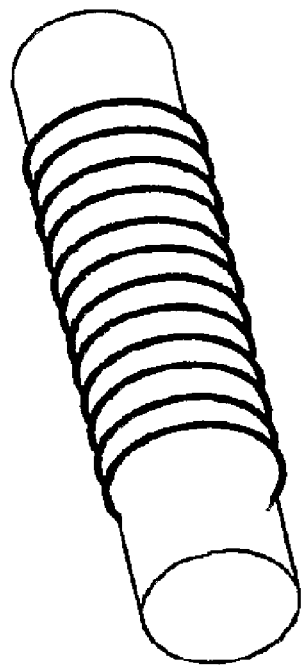
FIGS. 13A-13B show possible core designs.
Figure 13B:
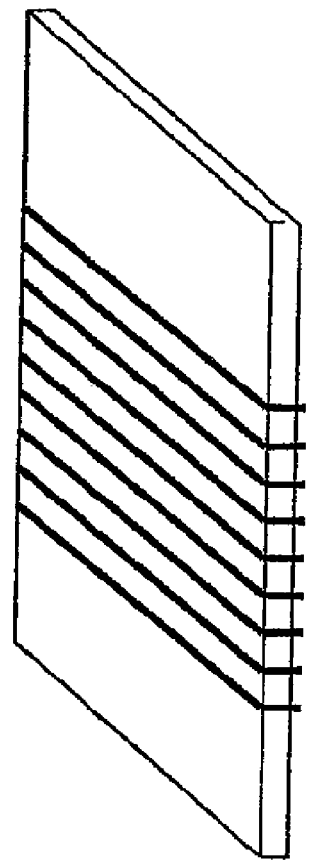

It will be appreciated that in the case of a device coil designed to receive power by picking-up flux travelling substantially in the plane of the charger, as opposed to orthogonal to it, numerous possible designs of core are possible, for example but not limited to:
a rod of permeable material with wire coiled around it (FIG. 13*a*) or
a flat piece of permeable material with a wire coiled flat around it (FIG. 13*b*), as in FIG. 1*c*.

It will also be appreciated that in any of the above, the precise shape of any coils in the device and/or charger will have an effect on the efficiency and other characteristics. For example, replacing any square coil with a circular coil may reduce efficiency somewhat, but, thanks to the rotational symmetry of a circle, allows the device to have a rotational degree of freedom.

The preferred features of the invention are applicable to all aspects of the invention and may be used in any possible combination.

Throughout the description and claims of this specification, the words "comprise" and "contain" and variations of the words, for example "comprising" and "comprises", mean "including but not limited to", and are not intended to (and do not) exclude other components, integers, moieties, additives or steps.

The invention claimed is:

1. A power transfer system comprising:
   at least one portable electrical device adapted to receive power by inductive coupling;
   a primary unit having an inductive power supply which supplies power inductively by the generation of an electromagnetic field;
   a generally flat power transfer surface disposed within the electromagnetic field and in proximity to which the at least one portable device is removably placed within the electromagnetic field, whereby the at least one portable device may move about on the generally flat power transfer surface with physical translational freedom and physical rotational freedom when placed on the generally flat power transfer surface, and further whereby the portable device may receive power from the primary unit through inductive coupling, the power transfer surface including a first visual indication of a desired placement of the at least one portable device with respect to the power transfer surface; and
   the portable electrical device including a second visual indication, the first visual indication and the second visual indication being complementary to provide visual guidance of the desired placement of the portable electrical device with respect to the power transfer surface, at least a portion of the first visual indication being visible when the portable electrical device is in the desired placement on the power transfer surface.

2. The power transfer system of claim 1 wherein the first visual indication is printed on the power transfer surface.

3. The power transfer system of claim 1 wherein the first visual indication comprises at least one line or arrow indicative of a desired angular orientation of the device with respect to the power transfer surface.

4. The power transfer system of claim 3 wherein the first visual indication comprises multiple lines or arrows.

5. The power transfer system of claim 1 wherein the first and second visual indications each comprise a target.

6. The power transfer system of claim 5 wherein each target comprises concentric circles.

7. The power transfer system of claim 1 further comprising a plurality of the first visual indications.

8. The power transfer system of claim 1 wherein the first visual indication and the second visual indication are patterns.

9. The power transfer system of claim 1 wherein the second visual indication is of a desired angular orientation of the one portable electrical device with respect to the power transfer surface.

10. The power transfer system of claim 9 wherein the second visual indication comprises an arrow.

11. A portable electrical device adapted to receive power by inductive coupling with a primary unit having an inductive power supply which supplies power inductively by the generation of an electromagnetic field, the portable electrical device adapted to be placed in proximity to a generally flat power transfer surface (a) disposed within the electromagnetic field and (b) including a first visual indication of a desired placement of the portable device with respect to the power transfer surface, the portable electrical device comprising a second visual indication, the first visual indication and the second visual indication being complementary to provide visual guidance of a desired placement of the portable electrical device with respect to the power transfer surface, at least a portion of the first second visual indication being visible when the portable electrical device is in a desired placement on the power transfer surface.

12. The portable electrical device of claim 11 wherein the first visual indication is printed on the power transfer surface.

13. The portable electrical device of claim 11 wherein the first visual indication comprises at least one line or arrow indicative of a desired angular orientation of the device with respect to the power transfer surface.

14. The portable electrical device of claim 13 wherein the first visual indication comprises multiple lines or arrows.

15. The portable electrical device of claim 11 wherein the visual indication comprises a target.

16. The portable electrical device of claim 15 wherein the target comprises concentric circles.

17. The portable electrical device of claim 11 further comprising a plurality of the first visual indications.

18. The portable electrical device of claim 11 wherein the first visual indication and the second visual indication are patterns.

19. The portable electrical device of claim 11 wherein the second visual indication comprises an arrow.

* * * * *

UNITED STATES PATENT AND TRADEMARK OFFICE
CERTIFICATE OF CORRECTION

PATENT NO.         : 8,354,821 B2
APPLICATION NO.    : 12/339509
DATED              : January 15, 2013
INVENTOR(S)        : Lily Ka-Lai Cheng et al.

It is certified that error appears in the above-identified patent and that said Letters Patent is hereby corrected as shown below:

Column 10, Claim 11, Line 23:
after "first" delete "second"

Signed and Sealed this
Fifth Day of March, 2013

Teresa Stanek Rea
*Acting Director of the United States Patent and Trademark Office*